(12) United States Patent
Douglas

(10) Patent No.: US 7,007,395 B2
(45) Date of Patent: Mar. 7, 2006

(54) WHEEL ALIGNMENT SYSTEM FOR SINGLE TRACK VEHICLES

(75) Inventor: Paul Allen Douglas, Atlanta, GA (US)

(73) Assignee: Apogee Design Corp., Atlanta, GA (US)

(*) Notice: Subject to any disclaimer, the term of this patent is extended or adjusted under 35 U.S.C. 154(b) by 16 days.

(21) Appl. No.: 10/748,350

(22) Filed: Dec. 30, 2003

(65) Prior Publication Data
US 2005/0138823 A1    Jun. 30, 2005

(51) Int. Cl.
*G01B 11/26* (2006.01)
(52) U.S. Cl. .................................... 33/288; 33/203.18
(58) Field of Classification Search ................. 33/227, 33/263, 264, 286, 288, 203, 203.18; 73/11.04, 73/11.07, 118.1
See application file for complete search history.

(56) References Cited

U.S. PATENT DOCUMENTS

| | | | |
|---|---|---|---|
| 3,901,604 A | 8/1975 | Butler | |
| 4,096,636 A | 6/1978 | Little | |
| 4,150,897 A | 4/1979 | Roberts, Jr. et al. | |
| 4,172,326 A | 10/1979 | Henter | |
| 4,466,196 A | 8/1984 | Woodruf | |
| 4,827,623 A | 5/1989 | Goodell | |
| 5,546,665 A | 8/1996 | Jackmauh | |
| 5,886,782 A | 3/1999 | Hedgecock, Jr. | |
| 6,240,648 B1 | 6/2001 | Dolph | |
| 6,438,855 B1 | 8/2002 | Bremer | |
| 6,543,145 B1 | 4/2003 | Lovesy | |

*Primary Examiner*—Eric S. McCall

(57) ABSTRACT

A method and apparatus for wheel alignment of single track vehicles, particularly motorcycles and bicycles having front alignment unit (20) including an alignment strut (21), a laser target (25), and a laser module (23) disposed from the longitudinal centerline of the vehicle front wheel (1) to emit a rearward projecting laser beam (9); and a rear alignment unit (40) including an alignment strut (21), a laser target (25), and a laser module (23) disposed from the longitudinal centerline of the vehicle rear wheel (4) to emit a forward projecting laser beam (8). Alternately either the laser target (25) of the front alignment unit (20) or of the rear alignment unit (40) can be a reflective mirror surface, whereby the forward or rearward projecting laser beams (8,9) are reflected toward the target of the opposite alignment unit. The forward and rearward projecting laser beams (8,9) are aligned with each other such that a common reference plane is formed, whereby the vehicle front and rear wheels (1,4) are aligned.

3 Claims, 9 Drawing Sheets

WHEEL ALIGNMENT SYSTEM FOR SINGLE TRACK VEHICLES

CROSS-REFERENCE TO RELATED APPLICATIONS

Not Applicable

FEDERALLY SPONSORED RESEARCH

Not Applicable

BACKGROUND OF THE INVENTION—FIELD OF INVENTION

This invention relates to single track vehicles particularly motorcycles and bicycles, specifically to wheel alignment for motorcycles and bicycles.

BACKGROUND OF THE INVENTION

Alignment of the front and rear wheels of single track vehicles, particularly motorcycles and bicycles is important in order to provide proper handling of the vehicle, vehicle stability, maximum vehicle performance, and minimum wear on tires and mechanical components of the vehicle. Wheel alignment is most critical on high performance racing motorcycles, which compete on road racing tracks where high velocities and rapid acceleration and braking forces expose any flaws in the vehicle configuration.

Most high performance motorcycles are driven by roller chains, which transfer the motive force from the transmission output shaft sprocket to a sprocket attached to the rear wheel. The rear wheels on such vehicles are normally carried in a swing arm, which pivots in the vehicle frame to allow the rear wheel to move up and down. The swing arm normally has slotted holes through which the rear wheel axel shaft passes. These slotted holes allow the rear wheel to be moved in a fore and aft direction in order to adjust the drive chain tension.

Such drive chains require frequent adjustments in order to maintain proper chain tension. Normally chain tension is adjusted by loosening the rear wheel axel shaft bolt, and moving the wheel axel shaft position in a fore and aft direction in the slotted holes of the swing arm to adjust the chain tension. When performing such a chain adjustment, the wheel is normally aligned with the vehicle swing arm by positioning the wheel axel shaft from side to side in the swing arm until marks on the centerline of the wheel axel shaft match with markings on each side of the swing arm.

Rear wheel alignment on motorcycles must be performed any time that drive chain tension is adjusted. In addition, other normal rear end maintenance activities such as chain replacement, and tire replacement require adjustment of the rear wheel alignment.

It is well known among motorcycle racers and mechanics that the alignment markings on motorcycle swing arms cannot be trusted to accurately align the rear wheel with the front wheel due to numerous manufacturing tolerances in the vehicle such as vehicle frame straightness, swing arm centerline axis position in relation to the frame centerline, swing arm straightness, swing arm strut length from side to side, swing arm alignment mark accuracy from side to side, front wheel fork centerline axis in relation to the frame centerline, front wheel fork straightness, and both front and rear wheel straightness. There is also the potential for slightly bent vehicle components from normal use or crash damage, which when considered with the numerous manufacturing tolerances, renders the swing arm alignment marks as useless.

Some motorcycle mechanics perform an alignment of the rear wheel in the swing arm by taking careful measurements with dial calipers from the rear of the swing arm to the centerline of the rear wheel axle shaft. This procedure is similar to alignment using the vehicle alignment markings on the swing arm. This procedure does overcome the potential of misplaced markings by the vehicle manufacturer, however, this alignment procedure does not address any of the other numerous factors effecting wheel alignment, such as vehicle manufacturing tolerances, or potential for bent vehicle components.

Clearly, the only way to accurately align the front and rear wheels of a single track vehicle such as a motorcycle or bicycle is by direct measurement between the front and rear wheels, thereby bypassing the effects of the numerous vehicle manufacturing tolerances and potentially bent components.

Motorcycle racers normally align front and rear tires by a procedure known as pulling string, in which a string of at least twice the length of the motorcycle is first taped to the back of the rear tire at the center of the string length. The two ends of the string are then pulled forward past the front tire and tied to stands in front of the motorcycle, with the stands positioned such that the string contacts the sides of the rear tire at the locus of points of maximum width along the sidewall of the tire. In this way the strings form two approximately parallel lines projecting forward from the sidewalls of the rear tire, past the front tires. Measurements are then taken from the strings to the locus of points of maximum tire width of the front tire sidewall. These measurements from the string to the front tire are compared from each side of the vehicle to determine if the rear tire is parallel with the front tire. The rear wheel axel shaft is then adjusted from side to side in the swing arm, the strings are repositioned to project forward with the rear tire in the new location, and measurements from the string to the front tire sidewalls are repeated to determine if alignment of the front and rear tires has been achieved. This process is repeated in a trial and error fashion until an adequate alignment between the front and rear tires is obtained.

The process of aligning front and rear tires by pulling string as described previously has two significant drawbacks: first, this process depends on the uniformity of the locus of points of maximum tire width at the rear and front tires, and the procedure is tedious and time consuming. In fact, the process of pulling string for tire alignment is so tedious that many motorcycle racers admit to not performing the wheel alignment process as often as they would like to.

Uniformity of the tire sidewall locus of points of maximum tire width is a potential problem with any alignment procedure that utilizes the tire sidewalls as a reference. The tire sidewalls on new tires are normally fairly uniform, but are subject to some variations due to tire manufacturing tolerances. However, an even greater effect in tire sidewall uniformity occurs due to tire wear. In the current state of the art in motorcycle racing tires, rubber tends to roll off the tire in thick balls that accumulate along the sidewalls of the tire, such that the sidewall locus of points in even a slightly worn racing tire is very irregular. This irregularity in the tire sidewall can strongly affect the accuracy of any alignment process that uses the tire sidewall as a reference point.

Knobby type tires as normally used on off road motorcycles and bicycles also present an irregular sidewall, such that the locus of points of maximum tire width on knobby type tires cannot be used as a reference for alignment of the front and rear wheels of such vehicles.

In the prior art, several possible apparatus for motorcycle wheel alignment have been disclosed:

Lovesy, U.S. Pat. No. 6,543,145 discloses an apparatus that attaches to a motorcycle swing arm shaft, and projects a laser beam to either the rear or to the front of the motorcycle, with the laser beam passing over parallel lines on a target that is attached to either the front or rear tires. This apparatus suffers from several deficiencies: the target is attached to the tire sidewalls, and therefore assumes that the locus of points of maximum tire width are completely uniform and parallel, the accuracy of the apparatus depends on the user's ability to judge parallelism between the laser beam and multiple parallel lines of the target, and the target apparatus described in this invention cannot be readily attached to the front tire of current motorcycle designs due to interferences with the front fork struts, front fender, and front brake discs.

Bremer, U.S. Pat. No. 6,438,855 describes a wheel alignment apparatus that projects laser beams on each side of the motorcycle from struts attached to the rear tire to targets attached to similar struts, which are attached to the front tire of the vehicle. The procedure for using this apparatus is basically the same as the procedure of pulling strings from the rear tire as described previously, with laser beams substituting for the strings. This apparatus suffers from the same deficiencies as the practice of pulling strings to align the front and rear tires, namely: irregularity of the tire sidewall strongly effects the accuracy of the apparatus, and the user must take measurements on each side of the front tire to determine parallelism, thereby making use of this apparatus tedious and time consuming.

Little, U.S. Pat. No. 4,096,636 discloses a wheel alignment tool consisting of a long beam that is set against the sidewalls of the rear tire, with a shorter beam that can be shimmed to contact the front tire sidewall when wheel alignment is achieved. This apparatus suffers from several disadvantages: the apparatus is long and bulky for transporting to race tracks, a single user cannot simultaneously adjust the rear wheel position and check the front to rear tire alignment, and irregularity of the tire sidewall can strongly effect the accuracy of the apparatus.

BACKGROUND OF INVENTION—OBJECTS AND ADVANTAGES

It is a primary object of the present invention to provide a method and apparatus for quick and accurate alignment of the front and rear wheels of single track vehicles, particularly motorcycles and bicycles.

The apparatus of the invention has the following additional objects and advantages:

(a) to provide a tool for alignment of motorcycle and bicycle wheels which is easily portable;

(b) to provide a tool for alignment of motorcycle and bicycle wheels which is easy to use;

(c) to provide a tool for alignment of motorcycle and bicycle wheels which is not influenced by irregularities of the vehicle tire sidewall;

(d) to provide a tool for alignment of motorcycle and bicycle wheels which is easy and relatively inexpensive to manufacture; and (e) to provide a tool for alignment of motorcycle and bicycle wheels which is easily adaptable to a very wide range of motorcycles and bicycles.

(f) to provide a tool for alignment of motorcycles and bicycles, which can be used while the vehicle is positioned on a side stand, as well as with the vehicle positioned on a center stand, pit stands, or other normally used vehicle lift or stand devices.

Other objects and advantages of my invention are to provide an apparatus that can be used to test for bent or warped wheels on motorcycles or bicycles.

Further objects and advantages of my invention will become apparent from a consideration of the drawings and ensuing description.

SUMMARY

Briefly stated, the invention is a method and apparatus for aligning the front and rear wheels of a motorcycle or bicycle, which is designed to satisfy the aforementioned needs, and provide the previously stated objects and advantages.

The preferred embodiment of the apparatus of the invention comprising identical front and rear alignment units mounted to center ribs of the front and rear wheels of the vehicle. Each alignment unit is comprised of alignment struts extending perpendicularly from the center ribs of front and rear wheels of the vehicle, with laser modules and laser targets mounted to each alignment strut, a threaded rod extending from each alignment strut through the vehicle wheel openings to outside wheel clamp beams, which are bolted to the threaded rods of the alignment struts in order to retain the alignment struts in position against the center ribs of the front and rear wheels of the vehicle.

The front alignment unit is positioned such that the laser module of the front alignment unit emits a laser beam projecting rearward onto the laser target of the rear alignment unit. The rear alignment unit is positioned such that the laser module of the rear alignment unit emits a laser beam projecting forward onto the laser target of the front alignment unit. Alternatively, either the front or the rear laser targets may be reflective mirror like surfaces to reflect the laser beam from the opposite alignment unit, such that a laser module is not required to be provided with the alignment unit having the target mirror. The vehicle front wheel is positioned such that the rearward projecting laser beam is brought into alignment with a target reference mark on the laser target of the rear alignment unit. The vehicle rear wheel is positioned such that the forward projecting laser beam is brought into alignment with a target reference mark on the laser target of the front alignment unit, so that the rearward projecting laser beam from the front laser module, and the forward projecting laser beam from the rear laser module form a common reference plane. The alignment struts of the front and rear alignment units thereby form perpendicular transversals between this common reference plane and the centerline of the vehicle front and rear wheels, such that the front and rear wheels of the vehicle are aligned with each other.

An additional embodiment of the apparatus of the invention primarily for use on vehicles which do not have wheel center ribs, additionally comprises inside wheel clamp beams mounted on the inside of each front and rear alignment unit, such that the front and rear wheels of the vehicle are clamped between the inside and outside wheel clamp beams. The rear alignment strut is then fastened to the inside wheel clamp beam of the rear wheel, and the front alignment strut is then positioned an offset distance from the inside wheel clamp beam of the front wheel. The offset distance for positioning the front alignment strut from the inside wheel clamp beam of the front wheel is equal to one half the difference between the width of the rear wheel of the vehicle and the width of the front wheel of the vehicle. Operation of the alternate embodiment of the invention is identical to the operation of the preferred embodiment as described previously.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
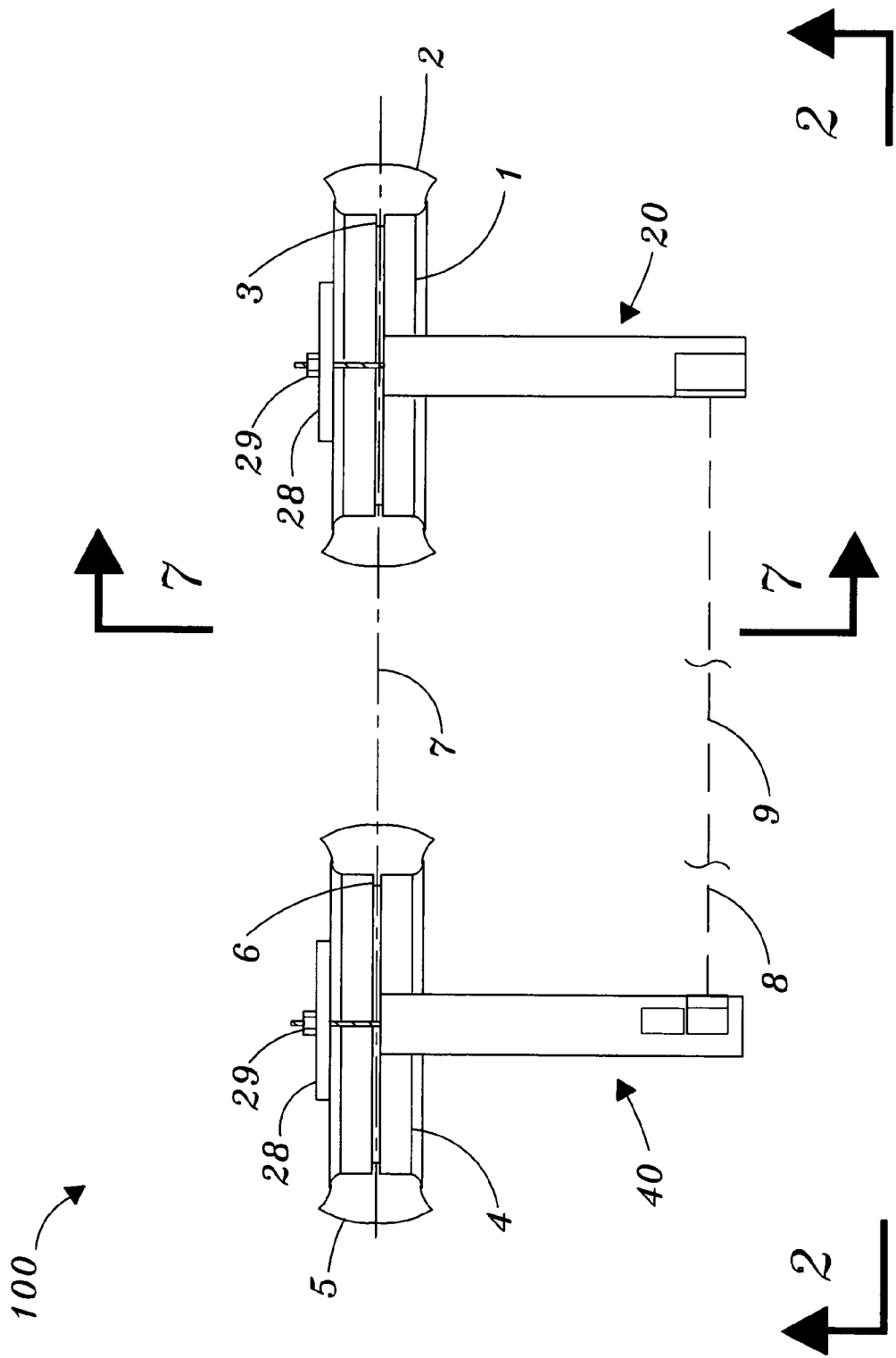
FIG. 1 is a schematic top view of a wheel alignment apparatus in accordance with the invention mounted on the front and rear wheels of a motorcycle.
Figure 2:
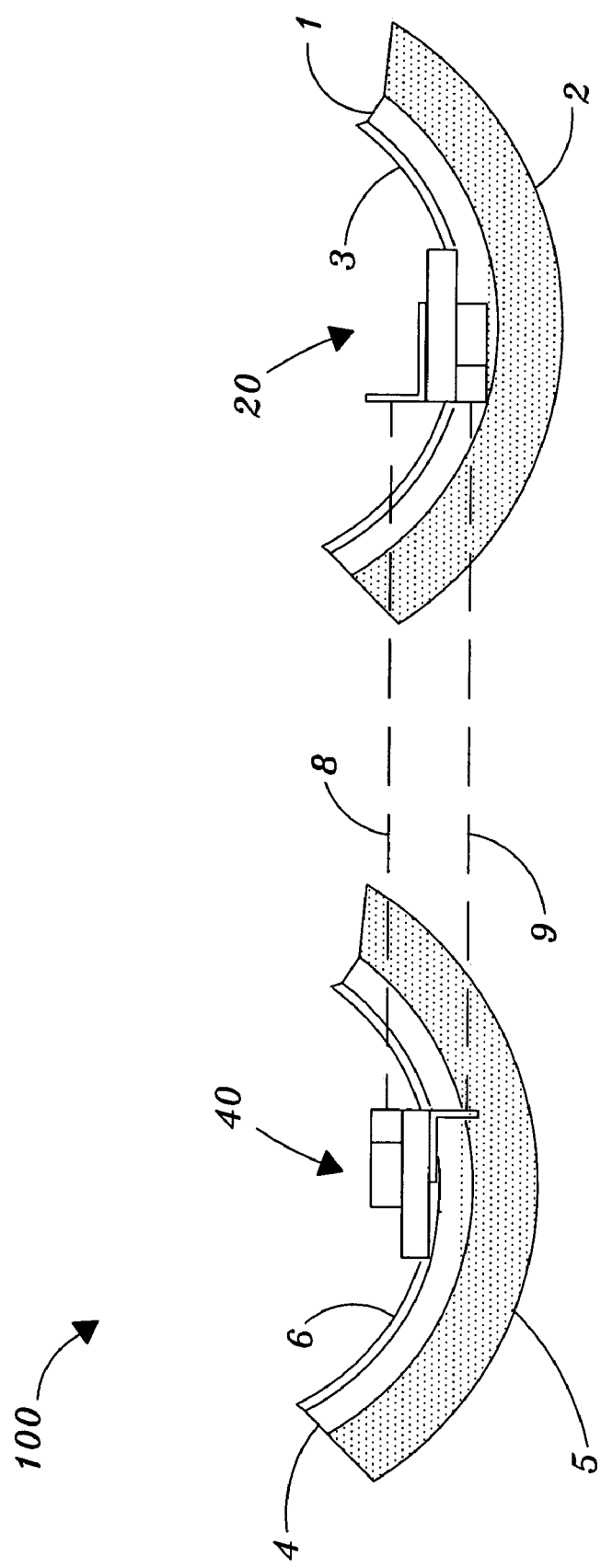
FIG. 2 is an elevation view of the apparatus of the invention of FIG. 1.

Now, referring to the drawings, wherein like numerals refer to like matter throughout, there is illustrated in FIG. 1 (plan view) and FIG. 2 (elevation view) the preferred wheel alignment apparatus of the invention generally designated by the numeral 100. The wheel alignment apparatus 100 includes a front alignment unit 20 and a rear alignment unit 40, which when used together align the vehicle front wheel 1 with the vehicle rear wheel 4 such that they are axially in-line with each other as represented by the vehicle wheel centerline 7. Vehicle front and rear tires 2, 5 are mounted to the vehicle front and rear wheels 1, 4. The vehicle front wheel 1 includes a vehicle front wheel center rib 3, which extends circumferentially inward from the inside of the wheel. The vehicle rear wheel 4 includes a vehicle rear wheel center rib 6, which extends circumferentially inward from the inside of the wheel.

Many motorcycle wheels, particularly wheels used on sporting motorcycles are commonly produced with center ribs such as the vehicle front and rear wheel center ribs 3, 6. Such vehicle wheel center ribs are raised areas of the wheel material that are normally centered on the longitudinal centerline of the wheel, and are normally approximately 0.2 inches in thickness, and extend approximately 0.2 inches circumferentially inward from the inside of the wheel. Such wheel center ribs are normally provided by motorcycle wheel manufacturers for use in the attachment of clip-on style wheel weights. In the case of the present invention, the front and rear alignment units 20,40 of the wheel alignment apparatus 100 are attached to the vehicle wheel center ribs 3,6. In order to allow use of the wheel alignment apparatus 100, it is important that the front wheel center rib 3 and the rear wheel center rib 6 are of identical and uniform thickness, and are centered precisely on the longitudinal centerlines of their respective wheels. Where a vehicle wheel is not equipped with such a wheel center rib arrangement, abbreviated center ribs may be added by welding or otherwise attaching tabs to the vehicle wheel to serve a similar function as the vehicle wheel center ribs 3,6. Alternatively, the wheel alignment apparatus 200 of the additional embodiment of the invention can be employed as described later.

The front and rear alignment units 20, 40 are, in the preferred embodiment, identical units in order to minimize manufacturing costs. Alternatively, separate designs or constructions of front and rear alignment units may be employed to accomplish the same function as the front and rear alignment units 20,40 described herein.

Figure 3:
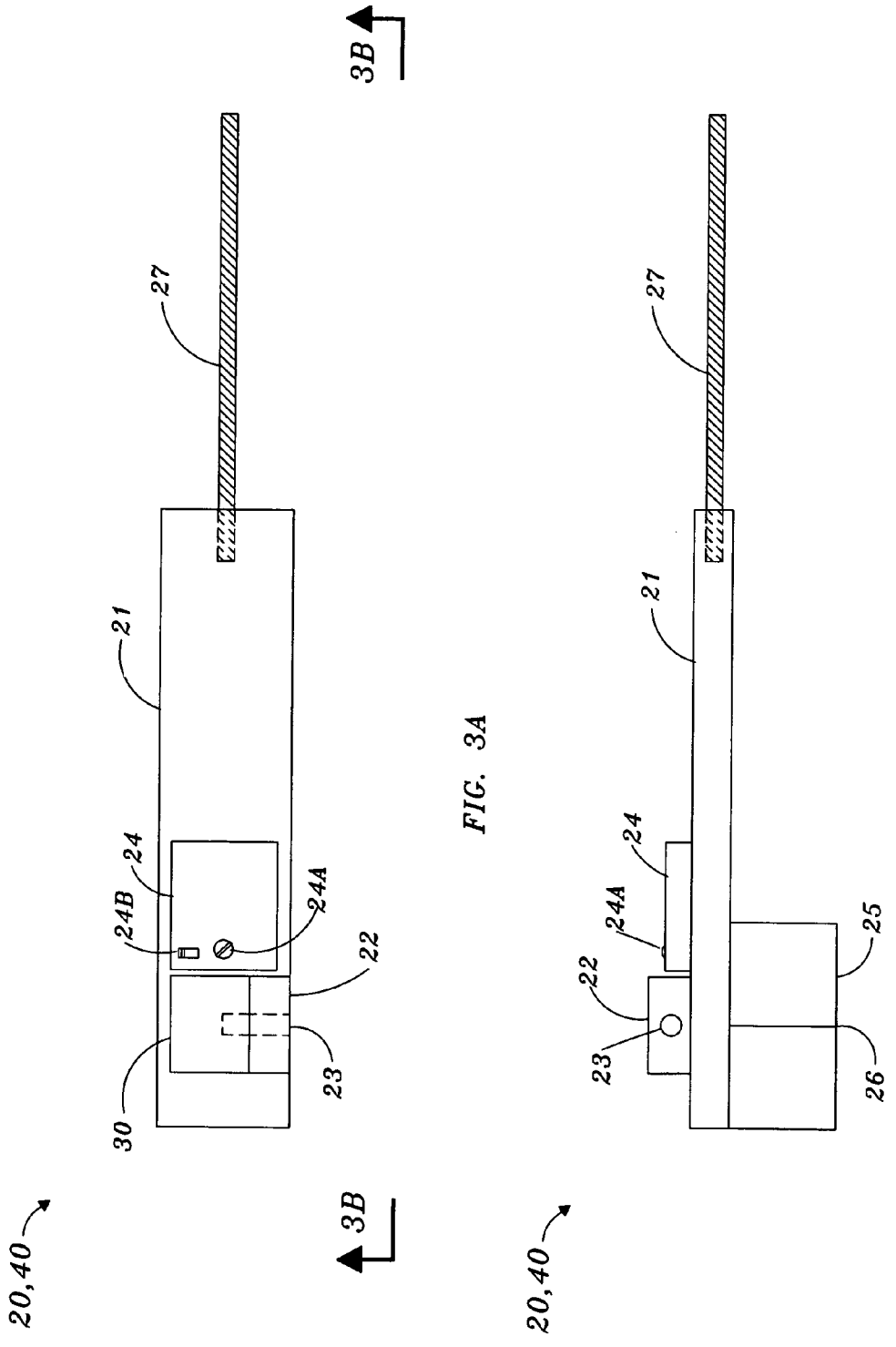
FIGS. 3A, and 3B are plan and elevation views of the front and rear alignment units of the apparatus of the invention.

Referring now to FIG. 3A (plan view) and FIG. 3B (elevation view), there is shown the front and rear alignment units 20,40. Each alignment unit consists of an alignment strut 21, to which is connected a laser module holder 22, in which is mounted a laser module 23. The laser module 23 is preferably powered by a battery powered power supply 24, which is fastened to the alignment strut 21 using a screw 24A. The power supply is any commercially available unit, which will supply the required electrical voltage and current needed for the laser module 23, and is preferably provided with an electrical switch 24B, for turning the laser module 23 on and off. A laser module cover 30 is provided for covering and protecting the electrical connections of the laser module. The end of the alignment strut 21 opposite the laser module holder 22 is provided with a threaded rod 27 extending along the centerline of the alignment strut 21. Preferably, the alignment strut 21 is a rigid material, which can be machined and threaded for attaching the threaded rod 27, and the screw 24A of the power supply 24. Preferably the alignment strut 21 and the laser module holder 22 are of like material such that the laser module holder 22 can be securely bonded in place using solvent chemical bonding, welding, or any other means which will securely attach the laser module holder 22 to the alignment strut 21. In practice it has been found that polyvinyl chloride (PVC) material satisfies the material requirements of the alignment strut 21 and the laser module holder 22.

The alignment strut 21 should be of sufficient thickness to allow for drilling and tapping of one end to accept the threaded rod 27. In practice it has been found that a three quarters inch (¾") thick alignment strut 21 will easily accommodate a five-sixteenths inch (5/16") threaded rod 27. The length of the alignment strut 21 can be any length which will at a minimum allow the forward and rearward projecting laser beams 8,9 as shown in FIG. 1 and FIG. 2 to pass by the edges of the front and rear tires 2,5. However, it is preferable to provide an alignment strut 21 with additional length as needed for the forward and rearward projecting laser beams 8,9 to pass by various types of motorcycle lifts and stands that are frequently employed by motorcycle mechanics and racers when performing maintenance work on the vehicle. In actual practice, an alignment strut 21 with a length of twelve inches (12") has been found to accommodate all currently popular configurations of motorcycle lifts and stands.

The alignment strut 21 should also be of sufficient width to form a chord across the inside of the vehicle front and rear wheels 1,4, which will allow the threaded rod 27 to pass over the top of the vehicle front and rear wheel center ribs 3,6 when the front and rear alignment units 20,40 are mounted in position on the vehicle front and rear wheels 1,4. In actual practice, it has been found that an alignment strut 21 with a width of two and one half inches (2½") will accommodate all currently popular configurations of motorcycle wheels.

The front and rear alignment units 20,40 are then each provided with the alignment strut 21 preferably composed of PVC material having dimensions of three-quarters inch (¾") thick, by twelve inches (12") long by two and one half inches (2½") wide. Alternatively, any material or configuration can be used which will provide an alignment strut, which will place the laser module 23 and laser target 25 at a predetermined distance from the longitudinal centerline of the vehicle front and rear wheels 1,4.

The laser target 25 is preferably of like material to the alignment strut 21 such that the laser target 25 can be securely bonded in place using solvent chemical bonding, welding, or any other means, which will securely attach the laser target 25 to the alignment strut 21. The laser target 25 is also preferably dark grey or black in color such that a laser beam can be easily seen without reflection. The laser target 25 is then preferably composed of dark grey PVC material bonded to the alignment strut using chemical solvent bonding. In practice, it has been found that a commercially available PVC angle having leg dimensions of two inches (2") by two inches (2") and four inches (4") in length provides sufficient frontal area for viewing a laser beam impinging on the front of the laser target 25. A target reference mark 26 is provided on the front surface of the laser target 25, and is preferably white in color in order to provide viewing contrast with the laser target 25. The target reference mark 26 is provided in the center of the laser target 25, and perpendicular to the long axis of the laser target 25, such that the target reference mark 26 is presented in a vertical position when the front and rear alignment units 20,40 are mounted on the vehicle. The front and rear alignment units 20,40 are then each provided with a laser target 25 preferably composed of grey colored one quarter inch (¼") thick PVC angle shape having leg dimensions of two inches (2") by two inches (2") and four inches (4") in length, having a target reference mark 26 of contrasting color vertically oriented on the front surface of the laser target 25. Alternatively, the laser target may be fabricated or molded as part of the alignment strut 21, or alternatively, the laser target 25 may be any material or configuration, which will provide an alignment reference mark, or measuring scale affixed to the alignment strut 21.

Alternatively, the laser target 25 of the rear alignment unit 40 may have a reflective mirror surface to reflect the laser beam from the front alignment unit 20 such that the laser module 23, laser module holder 22, and laser power supply 24 of the rear alignment unit 40 are not required. Or, alternatively, the laser target 25 of the front alignment unit 20 may have a reflective mirror surface to reflect the laser beam from the rear alignment unit 40 such that the laser module 23, laser module holder 22, and laser power supply 24 of the front alignment unit 20 are not required.

The laser module holder 22 is preferably of like material to the alignment strut 21 such that the laser module holder 22 can be securely bonded to the alignment strut 21. The laser module holder 22 is then preferably of PVC material solvent bonded to the PVC alignment strut 21 in a position such that a laser beam from the laser module 23 will project a line perpendicularly to the longitudinal axis of the alignment strut 21, and in the same plane as a line projected perpendicularly from the target reference mark 26. In practice, it has been found that a PVC bar of three quarters inch (¾") width by one and seven-eighths (1⅞") long provides sufficient bonding area for securely mating the laser module holder 22 to the alignment strut 21. The height of the laser module holder 22 is such that the laser module 23 can be inserted into a hole machined in the center of the material along the long axis of the laser module holder. In practice, it has been found that a three quarters inch (¾") thick PVC bar provides sufficient space for insertion of a wide selection of commercially available laser modules. An opening is provided in the laser module holder 22 of slightly smaller diameter than the laser module 23 such that the laser module 23 can be heat shrunk in place to securely capture the laser module. The front and rear alignment units 20,40 are then each provided with the laser module holder 22 preferably composed of PVC bar material having dimensions of three-quarters inch (¾") square width and height by one and seven-eighths inches (1⅞") long.

The laser module 23 is any commercially available laser module, which emits a visible collimated or focused type laser beam. In practice it has been found that a five milliwatt, 635 nanometer wavelength laser module provides a sufficient brightness to be plainly visible on the laser target 25 in bright sunlight in order to facilitate use of the apparatus outdoors at motorcycle racing facilities. The laser module 23 is preferably heat shrunk in place inside the laser holder 22 as previously described in order to securely capture the laser module 23 in the laser module holder 22. The laser module 23 with the laser module holder 22 are attached to the alignment strut in a position such that a laser beam from the laser module 23 will project a line perpendicular to the long axis of the alignment strut 21, and immediately above the target reference mark 26 of the laser target 25. Alternatively, the laser module 23 may be mounted directly in an opening machined or formed in the alignment strut 21, thereby eliminating the laser module holder 22 and eliminating the need for the laser module cover 30.

The laser module cover 30 is preferably of similar material to the alignment strut 21 and laser module holder 22, such that the laser module cover 30 can be bonded to both the alignment strut 21 and laser module holder 22. The laser module cover 30 is then preferably composed of PVC material to match the laser module holder 22 and the alignment strut 21, and is preferably approximately the same width and height as the laser module holder 22, and of sufficient length to cover the electrical connections at the rear of the laser module 23. The front and rear laser alignment units 20,40 are then provided with a laser module cover 30 preferably composed of one eighth inch (⅛") thick PVC material having dimensions of three-quarters inch (¾") high by one and seven-eighths inches (1⅞") wide by one and one half inches (1½") long. Alternatively any cover design can be used which will provide protection for the wiring connections of the laser module 23.

The threaded rod 27 is preferably of sufficient strength and rigidity for mounting of the front and rear alignment units 20,40 to the vehicle front and rear wheels 1,4. A five-sixteenths inch (5/16") diameter carbon steel threaded rod has proven to be adequate for this purpose. The threaded rod 27 should also be of sufficient length for mounting the alignment units 20,40 to any normally used width of motorcycle wheel. In practice, a rod length of nine inches (9") has proven to be sufficient for any currently employed motorcycle wheel width. The front and rear alignment units 20,40 are then each provided with a threaded rod 27 preferably composed of zinc coated carbon steel having five-sixteenths inch (5/16") diameter 18 UNC threads. Alternatively, any means may be provided, which will hold the front and rear alignment units 20,40 in position on their respective front and rear wheels 1,4.

Figure 4:
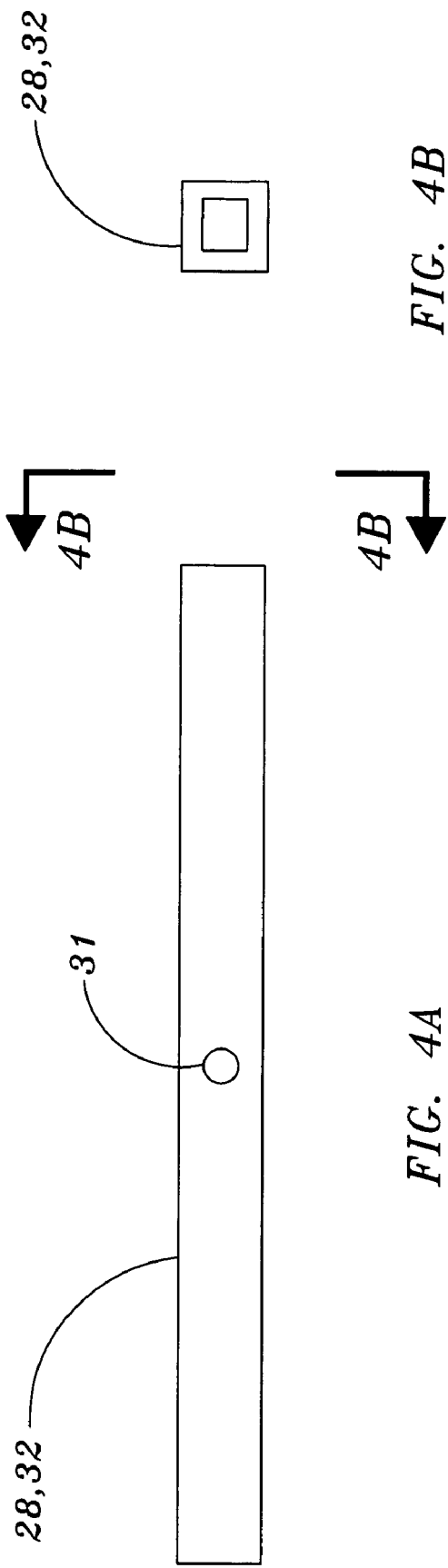
FIGS. 4A and 4B are side and end views of the inside and outside wheel clamp beams of the apparatus of the invention.

Referring now to FIGS. 4A and 4B, the wheel alignment apparatus 100 is provided with an outside wheel clamp beam 28, which is provided with an opening 31 for insertion of the threaded rod 27 when attaching the alignment units 20,40 to the vehicle. The outside wheel clamp beam 28 should have sufficient height and length to span across the outer lip of each of the vehicle front and rear wheels 2,4 to form a chord across the bottom of the wheel while the threaded rod 27 is placed in a position sufficient to pass over the top of the vehicle front and rear wheel center ribs 3,6 when the front and rear alignment units 20,40 are mounted in position on the vehicle front and rear wheels 1,4. In actual practice, it has been found that a wheel clamp beam 28 with a height of three quarters of an inch (3/4") and length of eleven inches (11") is sufficient to span across the outer lip of currently employed motorcycle wheels while avoiding interference with the vehicle tires and brake discs. The outside wheel clamp beam 28 should also have sufficient rigidity in the axis perpendicular with the long axis of the alignment strut 21 to avoid undue deflection. In practice it has been found that a three quarters inch (3/4") wide hollow square wheel clamp beam 28 having a wall thickness of one-eighth inch (1/8") aluminum material is sufficient to avoid undue deflection. An opening 31 is provided in the center of the wheel clamp beam 28 for insertion of the threaded rod 27 when the front and rear wheel alignment units 20,40 are mounted to the vehicle front and rear wheels 1,4. This opening is preferably eleven thirty seconds of an inch (11/32") in diameter for insertion of the five-sixteenths inch (5/16") threaded rod 27. The front and rear alignment units 20,40 are then each provided with an outside wheel clamp beam 28 preferably composed of one-eighth inch (1/8") thick aluminum material having dimensions of three-quarters inch (3/4") square cross sectional height and width, and eleven inches (11") long, having an opening 31 eleven thirty seconds of an inch (11/32") in diameter. Alternatively, any material or configuration may be provided for the outside wheel clamp beam 28 which will provide a means for attachment of the front and rear alignment units 20,40 to their respective front and rear wheels 1,4.

Figure 5:
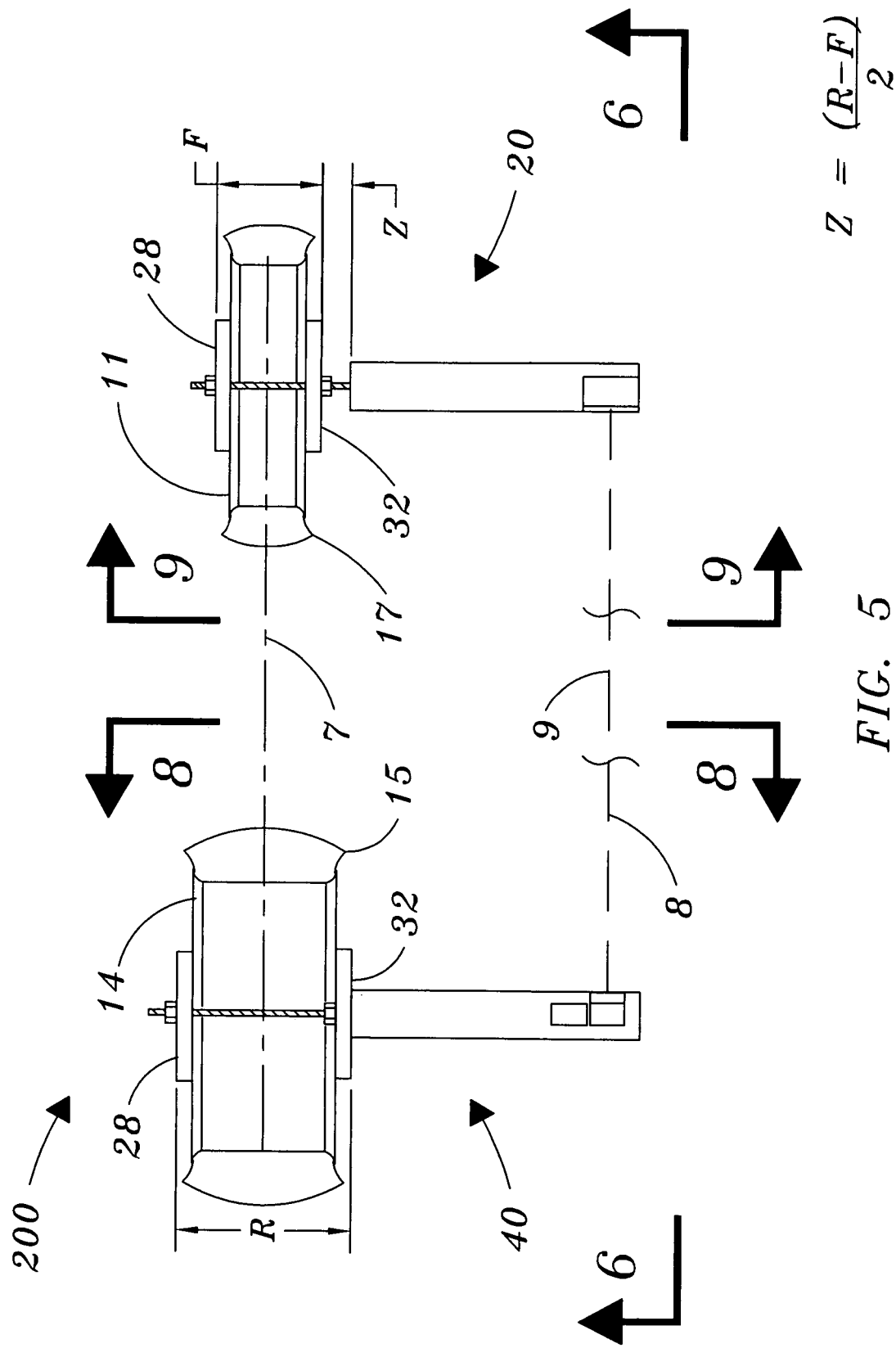
FIG. 5 is a schematic top view of an additional embodiment of the invention mounted on the front and rear wheels of a motorcycle.
Figure 6:
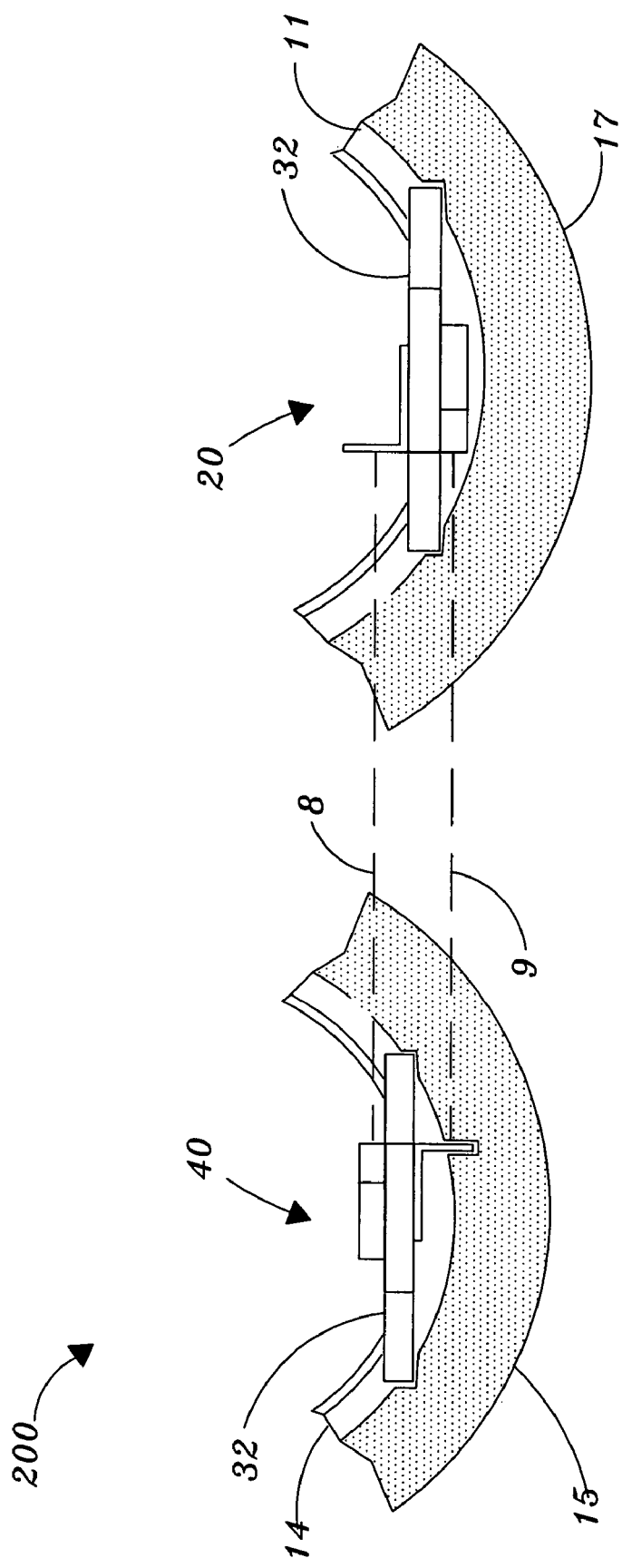
FIG. 6 is an elevation view of the apparatus of the invention of FIG. 5.

FIGS. 5 and 6—Additional Embodiment

An additional embodiment is shown in FIG. 5 (plan view) and FIG. 6 (elevation view), wherein the additional embodiment wheel alignment apparatus of the invention generally is designated by the numeral 200. The wheel alignment apparatus 200 includes a front alignment unit 20 and a rear alignment unit 40 along with front and rear mounted outside wheel clamp beams 28 as previously described in detail for the preferred embodiment wheel alignment apparatus 100. The wheel alignment apparatus 200 additionally includes front and rear wheel mounted inside wheel clamp beams 32, which serve to clamp the front and rear alignment units 20,40 to the vehicle front and rear wheels 17,15, on which are mounted the vehicle front and rear tires 12,15. The wheel alignment apparatus 200 is provided primarily for use on vehicles which do not have front and rear wheel center ribs 3,6, or on vehicles where the front wheel center rib 3 is not identically the same width as the rear wheel center rib 6, or in any other case where wheel center ribs are present, but are not desired to be used as a reference for the centerline of their respective wheels.

Operation of Preferred Embodiment—FIGS. 1,2,3A,3B,4A, 4B, and 7

Figure 7:
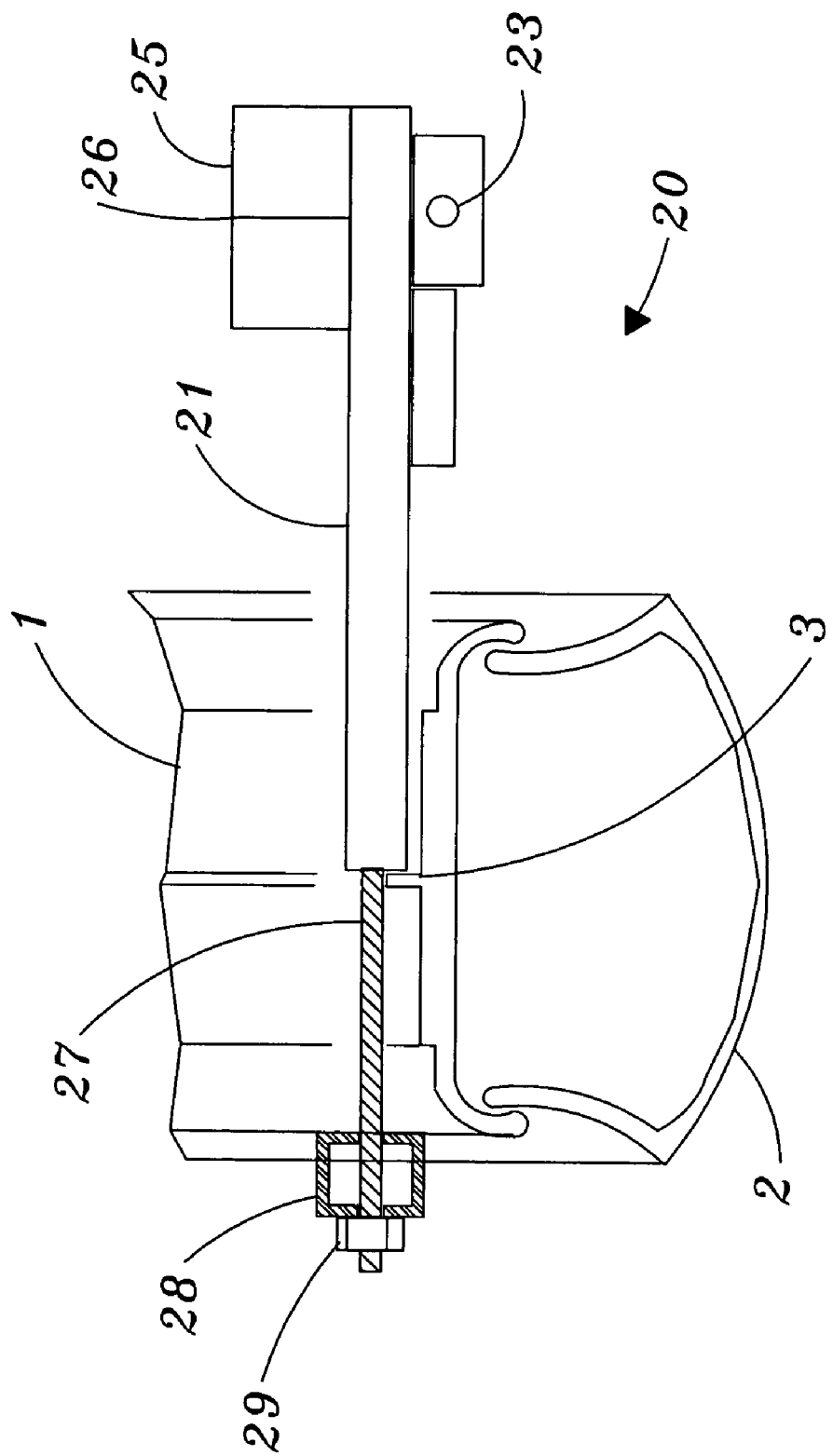
FIG. 7 is a sectional view of the front alignment unit of FIG. 1 mounted to a motorcycle wheel having a center wheel rib.
Figure 8:
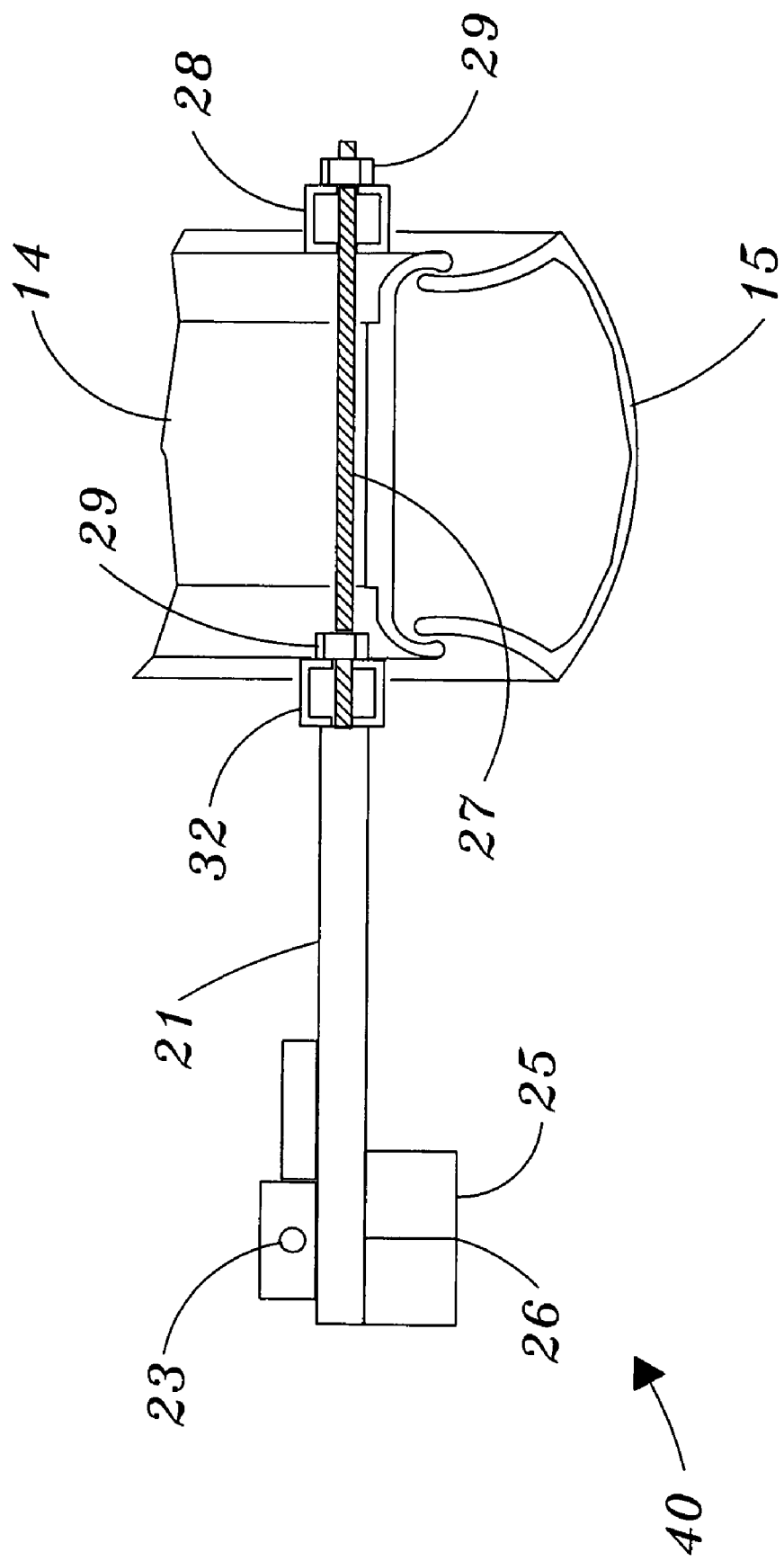
FIG. 8 is a sectional view of the rear alignment unit of FIG. 5 mounted to a motorcycle wheel, which does not have a center wheel rib.

In operation and now referring to FIGS. 1,2, and 7, the method of use of the preferred embodiment of the apparatus of the invention alignment apparatus 100 is hereafter described. Now, referring to FIG. 7, the front alignment unit 20 is first attached to the front wheel by positioning the front alignment unit 20 so that the laser module 22 and laser target 25 face toward the rear of the vehicle, and inserting the threaded rod 27 through openings in the vehicle front wheel 1 until the end of the alignment strut 21 contacts the vehicle front wheel center rib 3, and rests on the bottom of the inside of the front wheele 1. The outside wheel clamp beam 28 is then attached to the vehicle front wheel 1 by inserting the threaded rod 27 into the opening 31 of the threaded rod 28 until the wheel clamp beam 28 contacts the lip of the vehicle front wheel 1, forming a chord across the bottom of the front wheel. A nut 29 is then threaded onto the threaded rod 27, and tightened sufficiently to secure the alignment strut 21 tightly against the front wheel center rib 3. The rear alignment unit 40 is now secured to the vehicle rear wheel 4 using a similar method as the attachment of the front alignment unit 20 previously described, with the laser module 23 and the laser target 25 facing toward the front of the vehicle. The front and rear alignment units 20, 40 are then positioned facing each other on the vehicle as shown in FIG. 1 and FIG. 2.

The front and rear laser modules 23 are then turned on using the switch 24B of the power supply 24. The vehicle front wheel 1 is then turned such that the rearward projecting laser beam 9 is projected onto the target reference mark 26 of the laser target 25 of the rear alignment unit 40. The vehicle rear wheel 4 is then positioned using alignment screws or any other method provided by the vehicle manufacturer for alignment adjustment of the rear wheel 4 such that the forward projecting laser beam 8 is projected onto the target reference mark 26 of the laser target 25 of the front alignment unit 20, so that the forward projecting laser beam 8 and the rearward projecting laser beam 9 form a common reference plane. By this method, the alignment struts 21 of the front and rear alignment units 20,40 form perpendicular transversals between the common reference plane formed by the forward and rearward projecting laser beams 8,9 and the vehicle wheel centerline 7 between the vehicle front and rear wheels 1,4, whereby the front and rear wheels of the vehicle are aligned with each other.

In order to check the vehicle for potentially bent wheels, the wheel alignment apparatus 100 can be removed from the vehicle, and the front and rear wheels 1,4 can be rotated into various positions, accompanied by re-attachment of the alignment units 20,40 on various areas of the wheels. If the vehicle front or rear wheels 1,4 or the vehicle front or rear wheel center ribs 3,6 are bent, this will be seen by observing if the laser beam impinges on the laser target 25 in a different location than in the previous alignment.

The alignment apparatus 100 is normally mounted on the right side of the vehicle as previously described so that the apparatus may be used while the vehicle is on a side stand, which is normally on the left side of the vehicle for all currently popular motorcycles and bicycles. In this way, no special vehicle lifts or stands are needed for use of the apparatus. However, if the user prefers to employ a vehicle center stand, or a pit stand as normally used by motorcycle racers, the alignment apparatus 100 may also be mounted on the opposite side of the vehicle if desired.

Operation of Additional Embodiment—FIGS. 3A,3B,4A, 4B,5,6,8, and 9

In operation and now referring to FIGS. 5,6,8, and 9, the method of use of the additional embodiment alignment apparatus 200 is hereafter described. Now, referring to FIG. 8, the threaded rod 27 of the rear alignment unit 40 is first inserted through the opening 31 in the inside rear clamp beam 32 until the inside wheel clamp beam 32 is in intimate contact with the alignment strut 21 of the rear alignment unit 40. A nut 29 can then be optionally used to secure the inside wheel clamp beam 32 to the alignment strut 21 of the rear alignment unit 40. The rear alignment unit 40 is then positioned with the laser module 23 and laser target 25 facing toward the front of the vehicle, and the threaded rod 27 of the rear alignment unit 40 is then inserted through openings in the vehicle rear wheel 14 until the inside wheel clamp beam 32 comes in contact with the lip of the vehicle rear wheel 14, forming a chord across the inside bottom of the vehicle rear wheel 14. The outside wheel clamp beam 28 is then attached to the vehicle rear wheel 14 by inserting the threaded rod 27 into the opening 31 of the threaded rod 28 until the outside wheel clamp beam 28 contacts the lip of the vehicle rear wheel 14, forming a chord across the bottom of the wheel. A nut 29 is then threaded onto the threaded rod 27, and tightened sufficiently to secure the inside wheel clamp beam 32 and the outside wheel clamp beam 28 tightly against the rear wheel.

Figure 9:
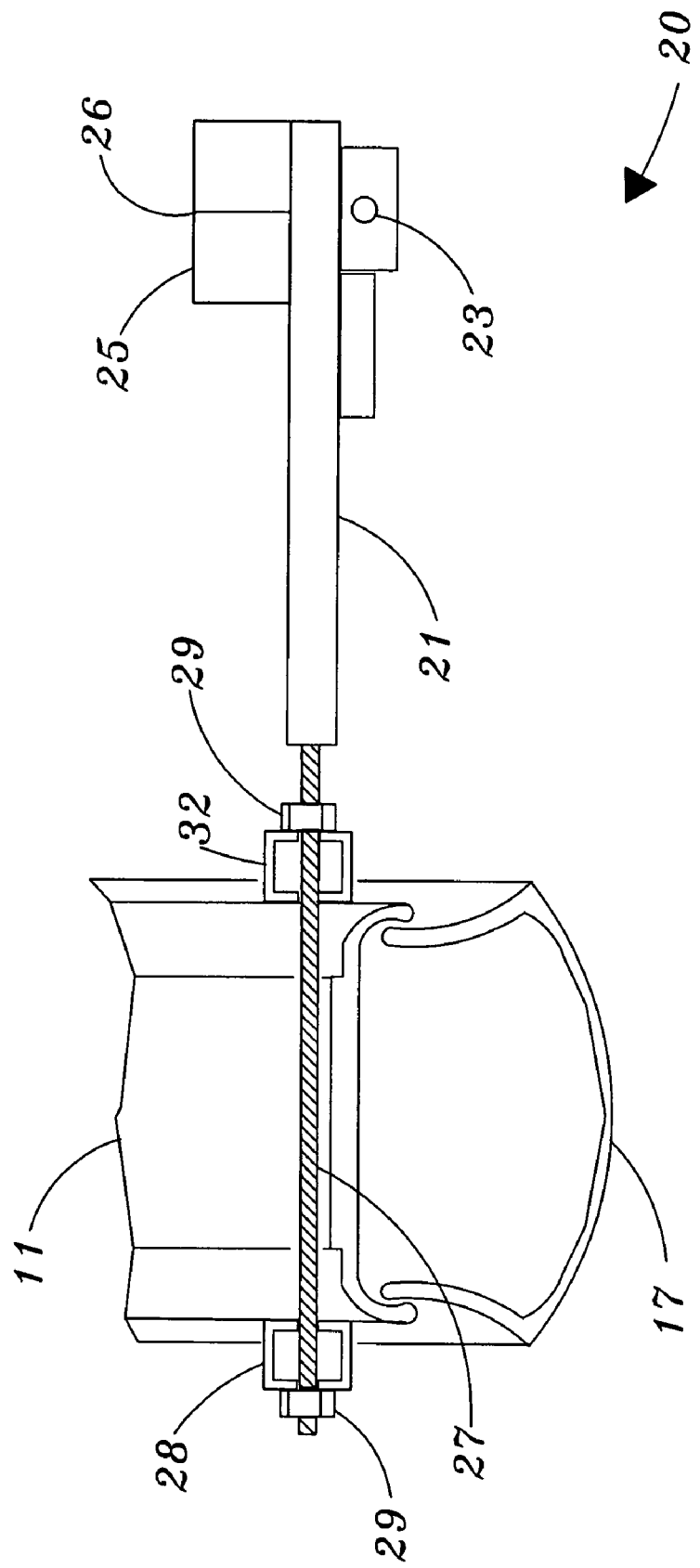
FIG. 9 is a sectional view of the front alignment unit of FIG. 5 mounted to a motorcycle wheel, which does not have a center wheel rib.

The method of attaching the front alignment unit 20 to the vehicle front wheel 11 is dependent on the relative widths between the rear wheel 14 and the front wheel 11. In the simplest case, if the vehicle front and rear wheels 11,14 are the same width as is normal with bicycles, the front alignment unit 20 is attached to the vehicle front wheel 11, using the same procedure as the attachment of the rear alignment unit 40 to the vehicle rear wheel 14 as previously described. If the vehicle rear wheel 14 is wider than the vehicle front wheel 11, as is frequently the case with high performance motorcycles, the front wheel alignment unit 20 should be attached to the vehicle front wheel 11 as shown in FIG. 9. Referring now to FIG. 9, a nut 29 is first threaded onto the threaded rod 27 of the front wheel alignment unit 20, and screwed almost all the way in until the nut 29 contacts the alignment strut 21 of the front alignment unit 20. Next, the threaded rod 27 of the front alignment strut 20 is inserted into the opening 31 of the inside wheel clamp beam 32, with the inside wheel clamp beam 32 contacting the nut 29. The front alignment unit 20 is then positioned with the laser module 23 and laser target 25 facing toward the rear of the vehicle, and the threaded rod 27 of the front alignment unit 20 is then inserted through openings in the vehicle front wheel 11 until the inside wheel clamp beam 32 comes in contact with the lip of the vehicle front wheel 11, forming a chord across the inside bottom of the vehicle front wheel 11. The outside wheel clamp beam 28 is then attached to the vehicle front wheel 11 by inserting the threaded rod 27 into the opening 31 of the outside wheel clamp beam 28 until the outside wheel clamp beam 28 contacts the lip of the vehicle front wheel 11, forming a chord across the bottom of the wheel. A second nut 29 is then threaded onto the threaded rod 27, and tightened sufficiently to secure the inside wheel clamp beam 32 and the outside wheel clamp beam 28 tightly against the front wheel.

Now, referring to FIG. 5, measurements are taken between the outside wheel clamp beam 28 and the inside wheel clamp beam 32 at the vehicle rear wheel 14, as indicated by the letter "R". Measurements are then taken between the outside wheel clamp beam 28 and the inside wheel clamp beam 32 at the vehicle front wheel 11, as indicated by the letter "F". An offset dimension "Z" is then computed as:

$$Z = \frac{(R - F)}{2}$$

If identical inside and outside wheel clamp beams (28,32) are employed having the same width, then the offset dimension "Z" as computed above will be equivalent to one half the difference between the width of the front and rear wheels (11,14).

The nuts 29 of the front alignment unit 20 are loosened, and the alignment strut 21 is positioned such that the distance between the inside wheel clamp beam 32 and the inside surface of the alignment strut 21 of the front alignment unit 20 is the same as the previously computed offset dimension "Z". If the offset dimension "Z" is less than the height of the nut 29 mounted on the inside of the front alignment unit 20, then this nut may be replaced with washer shims or spacers of whatever thickness are needed to achieve the required offset dimension "Z".

The front and rear laser modules 23 are then turned on, and the operation of the alignment apparatus 200 is thereafter identical to the operation of the alignment apparatus 100 described previously. Following the initial use of the alignment apparatus 200 on a specific vehicle, an additional nut (not shown) may be used to retain the inside wheel clamp beam 32 of the front alignment unit 20 in position such that no measurements or calculations are required the next time the apparatus is used on that specific vehicle.

Conclusions, Ramifications, and Scope:

It should be appreciated by those skilled in the art that the subject wheel alignment apparatus 100 of the preferred embodiment and the subject wheel alignment apparatus 200 of the additional embodiment provide for quick and accurate alignment of the front and rear wheels of single track vehicles, such as motorcycles and bicycles.

Furthermore, the apparatus of the invention:

Provides a tool for alignment of motorcycle and bicycle wheels which is easily portable;

Provides a tool for alignment of motorcycle and bicycle wheels which is easy to use;

Provides a tool for alignment of motorcycle and bicycle wheels which is not influenced by irregularities of the vehicle tire sidewall;

Provides a tool for alignment of motorcycle and bicycle wheels which is easy and relatively inexpensive to manufacture;

Provides a tool for alignment of motorcycle and bicycle wheels which is easily adaptable to a very wide range of motorcycles and bicycles;

Provides a tool which can be used on a motorcycle or bicycle while the vehicle is positioned on a side stand, such that no special vehicle stands or lifts are required in order to use the apparatus; and Provides a tool which can be used to test for bent or warped wheels on motorcycles and bicycles.

Although the description above contains many specificities, these should not be construed as limiting the scope of the invention but as merely providing illustrations of some of the presently preferred embodiments of this invention. Various modifications and substitutions may be made thereto without departing from the spirit and scope of the invention. Accordingly, it is to be understood that the present invention has been described by way of illustration and not limitation.

I claim:

1. A method for alignment of front and rear wheels of a single track vehicle, in particular a motorcycle or bicycle, comprising the steps of:
   (a) providing a front reference line perpendicularly from the longitudinal centerline of said front wheel to one side of said vehicle and having a front alignment reference point located along said front reference line at a fixed distance from the longitudinal centerline of said front wheel;
   (b) providing a rear reference line perpendicularly from the longitudinal centerline of said rear wheel to the same side of said vehicle and having a rear alignment reference point located along said rear reference line at said fixed distance from the longitudinal centerline of said rear wheel;
   (c) providing a rearward projecting alignment reference line perpendicularly oriented to said front reference line and located at said fixed distance from the longitudinal centerline of said front wheel;
   (d) providing a forward projecting alignment reference line perpendicularly oriented to said rear reference line and located at said fixed distance from the longitudinal centerline of said rear wheel;
   (e) said front wheel being moved angularly with respect to the vehicle centerline such that said rearward projecting alignment reference line is aligned with said rear alignment reference point, and said rear wheel being moved angularly with respect to the vehicle centerline such that said forward projecting alignment reference line is aligned with said front alignment reference point, so that a common reference plane is formed, with said front reference line and said rear reference line forming perpendicular transversals between said common reference plane and the longitudinal centerline between said front and said rear wheels;
   whereby said front wheel and said rear wheel are aligned with each other.

2. An additional embodiment apparatus for alignment of front and rear wheels of a single track vehicle, in particular a motorcycle or bicycle, comprising:
   (a) a front inside wheel clamp beam extending across the lip of said front wheel so that said front inside wheel clamp beam forms a chord across the lip of said front wheel;
   (b) a front alignment unit including a front alignment strut, front laser module, and front laser target having an opaque surface and having a front alignment target reference mark placed at a fixed and pre-determined distance along the length of said front alignment unit;
   (c) a means for disposing said front alignment strut perpendicularly to said front inside wheel clamp beam so that a rearward projecting laser beam from said front laser module projecting perpendicularly to said front alignment strut will be parallel to the longitudinal centerline of said front wheel with said laser module and said front alignment target reference mark located at a precise and known distance from the centerline of said front wheel;
   (d) a rear inside wheel clamp beam extending across the lip of said rear wheel so that said rear inside wheel clamp beam forms a chord across the lips of said rear wheel;
   (e) a rear alignment unit including a rear alignment strut and a rear target mirror having a reflective surface and having a rear alignment target reference mark placed at a fixed and pre-determined distance along the length of said roar alignment unit;
   (f) means for disposing said rear alignment strut perpendicularly to said rear inside wheel clamp beam so that said rear alignment target reference mark will be located at a precise and known distance from the centerline of said rear wheel, and such that said rearward projecting laser beam will be reflected as a forward projecting laser beam toward said front laser target;
   (g) said front wheel being moved such that said rearward projecting laser beam is aligned with said rear alignment target reference mark, and said rear wheel being moved such that said forward projecting laser beam is aligned with said front alignment target reference mark, such that said forward projecting laser beam and said rearward projecting laser beam form a common reference plane parallel to the centerline between said front and said rear wheels;
   (h) The alignment apparatus of claim 1 wherein said means for disposing said front alignment strut perpendicularly to said inside wheel clamp beam of said front wheel with said front laser module and said front alignment target reference mark located at a precise and known distance from the centerline of said front wheel consists of an outside wheel clamp beam and threaded rod for clamping said inside wheel clamp beam and said outside wheel clamp beam onto said front wheel, with said front alignment unit positioned an offset distance from said front inside wheel clamp beam with said offset distance being equal to one half the difference in width between said rear wheel and said front wheel;
   whereby, said front wheel and said rear wheel are aligned with each other.

3. An additional embodiment apparatus for alignment of front and rear wheels of a single track vehicle, in particular a motorcycle or bicycle, comprising:
   (a) a front wheel clamp beam extending across the lip of said front wheel so that said front inside wheel clamp beam forms a chord across the lip of said front wheel;
   (b) a front alignment unit including a front alignment strut, front laser module, and front laser target having an opaque surface and having a front alignment target reference mark placed at a fixed and pre-determined distance along the length of said front alignment unit;
   (c) a means for disposing said front alignment strut perpendicularly to said front inside wheel clamp beam so that a rearward projecting laser beam from said front laser module projecting perpendicularly to said front alignment strut will be parallel to the longitudinal centerline of said front wheel with said laser module and said front alignment target reference mark located at a precise and known distance from the centerline of said front wheel;
   (d) a rear inside wheel clamp beam extending across the lip of said rear wheel so that said rear inside wheel clamp beam forms a chord across the lip of said rear wheel;
   (e) a rear alignment unit including a rear alignment strut and a rear target mirror having a reflective surface and having a rear alignment target reference mark placed at a fixed and pre-determined distance along the length of said rear alignment unit;

(f) means for disposing said rear alignment strut perpendicularly to said rear inside wheel clamp beam so that said rear alignment target reference mark will be located at a precise and known distance from the centerline of said rear wheel, and such that said rearward projecting laser beam will be reflected as a forward projecting laser beam toward said front laser target;

(g) said front wheel being moved such that said rearward projecting laser beam is aligned with said rear alignment target reference mark, and said rear wheel being moved such that said forward projecting laser beam is aligned with said front alignment target reference mark, such that said forward projecting laser beam and said rearward projecting laser beam from a common reference plane parallel to the centerline between said front and said rear wheels;

(h) The alignment apparatus of claim 1 wherein said means for disposing said rear alignment strut perpendicularly to said inside wheel clamp beam of said rear wheel with said rear alignment target reference mark located at a precise and known distance from the centerline of said rear wheel consists of an outside wheel clamp beam and threaded rod for clamping said inside wheel clamp beam and said outside wheel clamp beam onto said rear wheel;

whereby, said front wheel and said rear wheel are aligned with each other.

\* \* \* \* \*